(No Model.)
P. P. HERBERG & P. H. CLAUSSEN.
FEEDING APPARATUS FOR GRAIN SEPARATORS, &c.
No. 265,804. Patented Oct. 10, 1882.
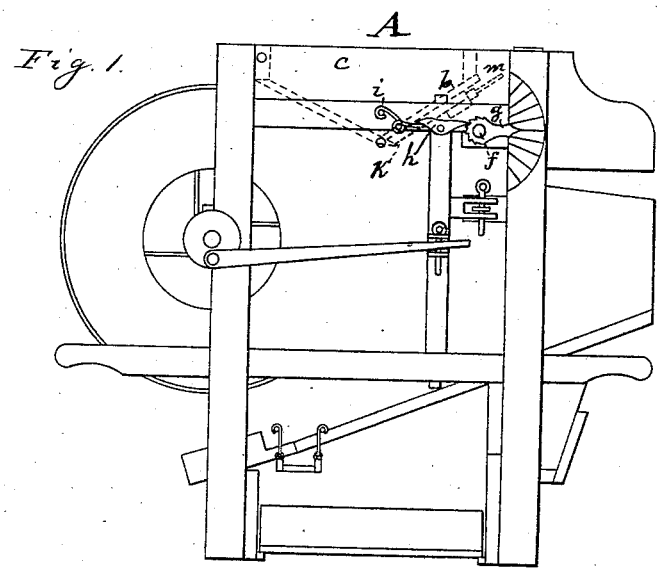
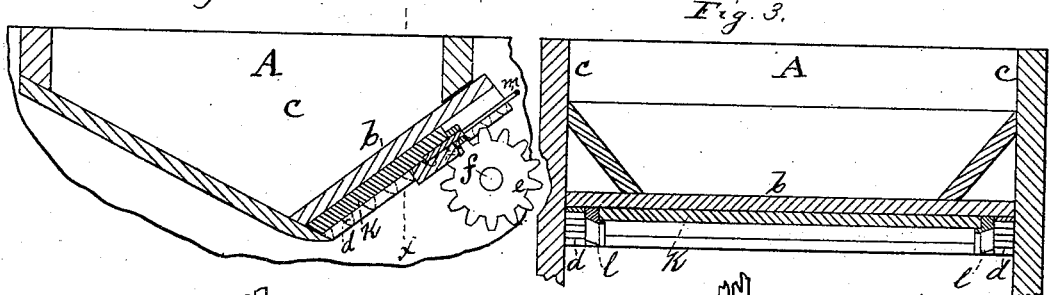
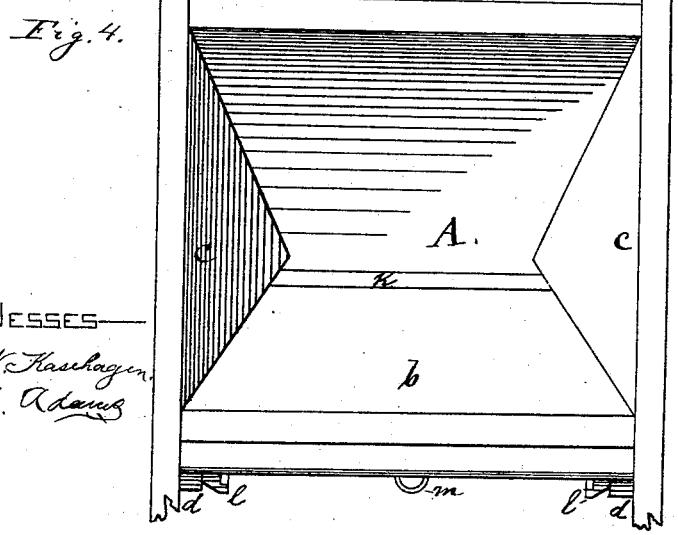
WITNESSES
F. W. Kaschagen
D. Y. Adams
INVENTORS
Paul P. Herberg
Peter H. Claussen
By Wm H Lotz
Attorney

UNITED STATES PATENT OFFICE.

PAUL P. HERBERG AND PETER H. CLAUSSEN, OF GALE, TREMPEALEAU COUNTY, WISCONSIN.

FEEDING APPARATUS FOR GRAIN-SEPARATORS, &c.

SPECIFICATION forming part of Letters Patent No. 265,804, dated October 10, 1882.

Application filed May 9, 1882. (No model.)

*To all whom it may concern:*

Be it known that we, PAUL P. HERBERG and PETER H. CLAUSSEN, of the township of Gale, in the county of Trempealeau and State of Wisconsin, have invented certain new and useful Improvements in Feeding Apparatus for Grain-Separators, &c.; and we do hereby declare that the following is a full, clear, and exact description thereof, reference being had to the accompanying drawings, and to the letters of reference marked thereon, which form a part of this specification.

This invention relates to improvements in feeding apparatus for grain-separators, fanning-mills, and other machines for similar purposes; and it has for its object to produce a hopper the feed-opening in which can be regulated by shifting of the main gate, and which is provided with an auxiliary gate that can be closed for shutting off the feed instantly without disturbing such main gate.

Therefore our invention consists of the novel feeding apparatus hereinafter described and specifically claimed.

In the accompanying drawings, Figure 1 represents a side elevation of a grain-separator having our improvements; Fig. 2, a longitudinal vertical section of the hopper; Fig. 3, a cross-section on line $x\ x$ in Fig. 2, and Fig. 4 a plan of the hopper.

Corresponding letters in the several figures of the drawings designate like parts.

A denotes the hopper of a grain-separator or fanning-mill, the rear part, $b$, of which forms a gate, which may be adjusted higher or lower for regulating the feed. This gate $b$ is either to move in grooves cut in the side boards, $c$, of the hopper or upon guide-strips fastened thereto, and has two rack-bars, $d$, secured under its ends, the teeth of which will mesh into the teeth of two pinions, $e$, which are mounted upon a shaft, $f$. This shaft $f$ works in bearings secured to the casing-frame of the machine, and upon its projecting end is secured a crank, $g$, the hub of which has ratchet-teeth that engage with a pawl, $h$, depressed by a spring, $i$. The pointed end of crank $g$ forms the hand over a graduated scale marked on one of the posts of the machine-frame for indicating the exact size of the feed-opening. An auxiliary gate, K, is secured between guide-strips $l$ against the bottom surface of the main gate $b$, so as to slide thereon. This auxiliary gate K has a handle, $m$, by which it is shifted to open or close the feed-opening of the hopper. In case of an obstruction or a choking of the grain in the separator, the feed of the grain can be shut off suddenly by simply pushing down the auxiliary gate K, and without the necessity of releasing the pawl $h$ from the ratchet-teeth of crank $g$, as would be necessary for shutting off the feed by the main gate $b$, and would require more time than closing the auxiliary valve; and then, after such obstruction has been removed and the machine is in condition to continue satisfactory operation, the auxiliary valve is opened again, when the feed will continue without having deranged the feed-opening in the hopper as once adjusted.

What we claim is—

The herein-described feeding apparatus for grain-separators, comprising hopper A, main gate $b$, shaft $f$, the racks and pinions $d\ e$, crank $g$, having pointed end and ratchet-teeth, pawl $h$, graduated scale, the auxiliary gate K, and grooves and guide-strips for the gates, all substantially as and for the purpose described and shown.

In testimony that we claim the foregoing as our invention we affix our signatures in presence of two witnesses.

PAUL P. HERBERG.
PETER H. CLAUSSEN.

Witnesses:
LUDWIG N. HAMMER,
J. W. ALEXANDER.